(Model.)
2 Sheets—Sheet 1.

G. F. NUTTING, P. S. RICH & J. GARFIELD.
CORN PLANTER.

No. 330,798.
Patented Nov. 17, 1885.

WITNESSES.
Ch. I. King.
Jas. A. Ryan.

INVENTOR
G. F. Nutting
P. S. Rich.
Joel Garfield
By his Atty
Geo. E. Burt

N. PETERS, Photo-Lithographer, Washington, D. C.

(Model.) 2 Sheets—Sheet 2.
G. F. NUTTING, P. S. RICH & J. GARFIELD.
CORN PLANTER.
No. 330,798. Patented Nov. 17, 1885.
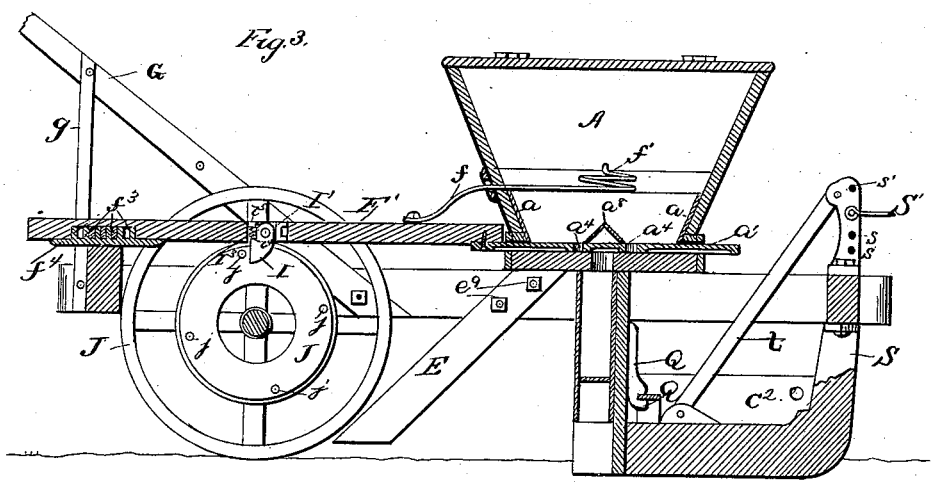
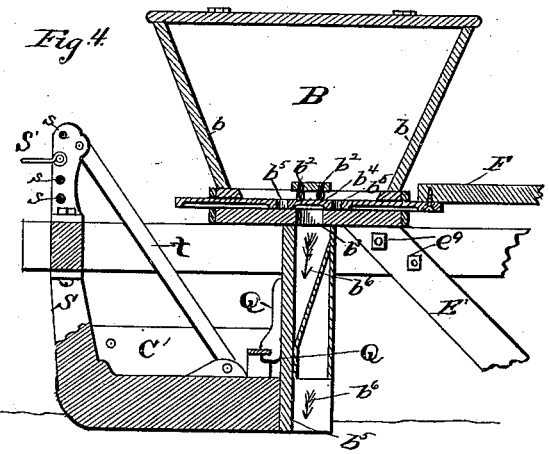
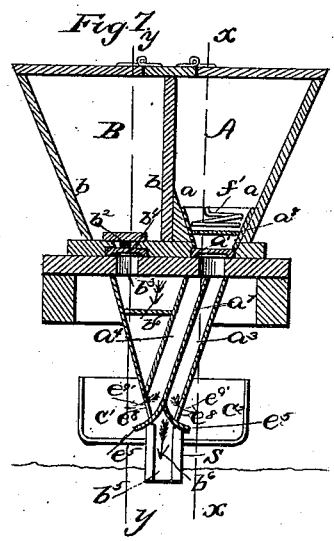
WITNESSES
H. J. King.
Jas. A. Ryan.
INVENTOR.
G. F. Nutting.
P. S. Rich.
Joel Garfield.
By his Atty. Geo. E. Burt

UNITED STATES PATENT OFFICE.

GEORGE F. NUTTING, OF RANDOLPH, VERMONT, AND PEMBROKE S. RICH AND JOEL GARFIELD, OF WORCESTER, MASSACHUSETTS.

CORN-PLANTER.

SPECIFICATION forming part of Letters Patent No. 330,798, dated November 17, 1885.

Application filed February 5, 1885. Serial No. 154,976. (Model.)

*To all whom it may concern:*

Be it known that we, GEORGE F. NUTTING, PEMBROKE S. RICH, and JOEL GARFIELD, citizens of the United States, and residing, respectively, at Randolph, in the county of Orange, State of Vermont, and in the city of Worcester and county of Worcester, and State of Massachusetts, have invented a new and useful Improvement in Corn-Planters, of which the following is a specification.

This invention relates to seed-planters, and it is designed more especially for use as a corn-planter.

The object of our invention is to deposit a fertilizer in such position with relation to the corn that the fertilizer and corn will not come in contact with each other; and the invention consists in the construction, combination, and arrangement of parts, as will be hereinafter fully described, reference being had to the accompanying drawings, in which—

Figure 1:
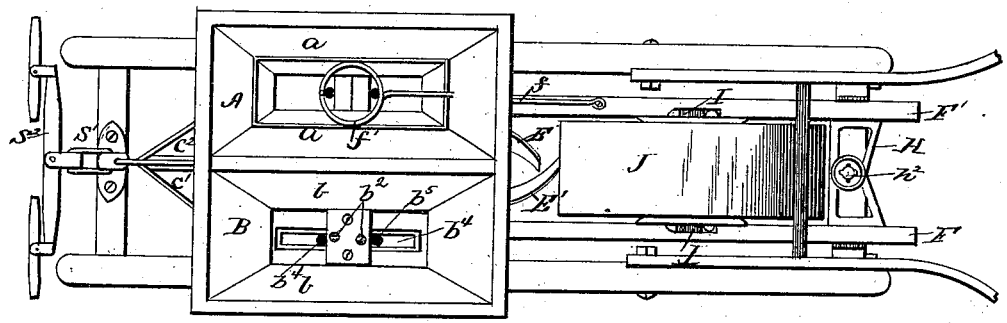
Figure 2:
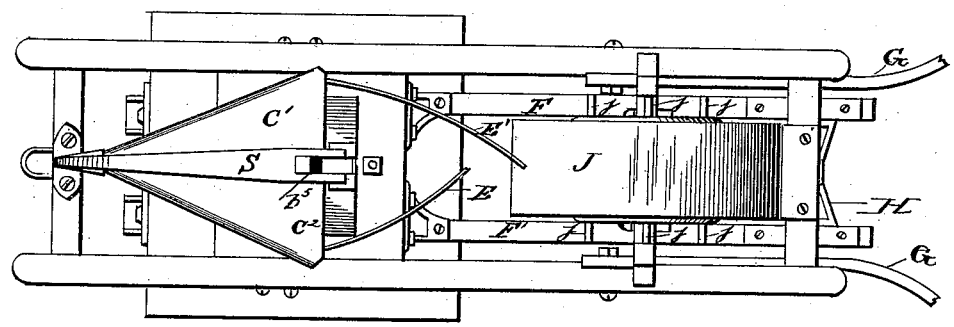
Figure 5:
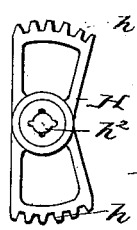
Figure 6:
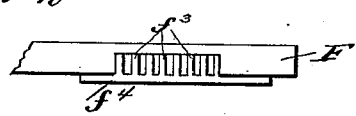

Figure 1 is a top view of our device. Fig. 2 is a bottom view of the same. Fig. 3 is a cross-section on the line $x\,x$ of Fig. 7. Fig. 4 is a cross-section on the line $y\,y$ of Fig. 7. Fig. 5 is a detail view of a vibrating lever, also of a corrugated plate which works in conjunction with said lever. Fig. 6 is a detail view of a spring-catch, which will be explained hereinafter. Fig. 7 is a vertical cross-section.

It will be observed that the top of the planter is provided with a hopper, which is divided into two sections, A and B. By reference to Fig. 7 it will be observed that the inclined sides $a\,a$ of the hopper A, which are near the bottom of the latter, incline directly to a feed-plate or cut-off, $a'$, thus preventing the formation of any accumulation of fertilizers in the bottom of the hopper A. It will also be observed that A is provided with an agitator, $f'$, which is on the end of a wire, $f$, the latter being secured to the vibrating side piece F'. By reference to the same figure (7) it will be observed that the bottom of hopper B is provided with a hole, $b^3$, which is also covered by a second feed-plate or cut-off, $b^4$, which is provided with holes $b^5\,b^5$, said plate being secured to the vibrating side piece F. The vibrating side pieces, F F', are provided with plates $f^4$ $f^4$, which plates are also provided with serrations $f^3$. By reference to Fig. 2 it will be observed that these plates which are provided with the serrations $f^3$ operate in conjunction with the vibrating-lever H, (shown in detail in Fig. 5,) which is provided with cogs $h$, which correspond with the serrations $f^3$ on the plates $f^4$. By reference to Fig. 3 it will also be observed that the wheel J is provided with pins $j$, which act upon a spring-catch, I, which in its forward movement causes the side pieces, F F', to vibrate alternately in opposite directions.

In Figs. 1 and 2 both of the vibrating side pieces, F F', are shown, as are also both sides of the wheel J and the pivoted vibrating lever H, and it will be seen at a glance that while one of the vibrating side pieces is moved forward by the pins $j\,j$ the other vibrating side piece will be moved backward through the medium of the vibrating lever H, which is pivoted at $h^2$.

By reference to Fig. 6 it will be seen that we form the spring-catch I with the inclined face $i^2$ on one side and with the straight face $i^3$ on the opposite side. Directly over the face $i^3$ is a projection, $i^4$, and just above this projection is another projection, $i^5$, the two latter being provided with pins I², between which is a coil-spring, I³. In front of the projection $i^4$ is a lug, $i$, and back of the inclined face $i^2$ is another lug, I'. These lugs regulate both the forward and backward movement of the catch I, while the spring I³ causes the catch I to automatically resume its normal position, which is shown in Fig. 6. By so constructing this catch I the planter may be drawn backward, and the pins $j\,j$, sliding down the inclined face $i^2$, will cause the catch I to move up out of the way without vibrating the side pieces, F F'. This is of importance, as it often occurs that it is necessary to move the planter backward over a stony piece of ground, or where it is desired on account of the moisture at a certain locality to plant a double portion of the grain.

In the center of the hopper B, as will be seen in Fig. 4, we provide cut-off brushes $b^2$, which are secured to a cross-piece in the hopper, and which serve to remove the surplus seed.

In the center of hopper A, as will be seen by reference to Fig. 3, is a conical inclined partition or projection, $a^8$. It will be readily understood that this conical incline will prevent any clogging of the fertilizer between the holes $a^4 a^4$ in the feed-plate.

By reference to Fig. 2 it will be observed that the lower front portion of the planter is provided with a plow-blade, S, which is also provided with wings C' and $C^2$, which extend outward and upward and crowd the dirt back, forming a trench, in which is deposited the fertilizer through the openings $e^8 e^8$ in the bottom of the conductors $a^3 a^4$. (Shown more clearly in Fig. 7.)

It will be observed that the plow-blade S extends a considerable distance below the wings C' $C^2$, which will necessitate the depositing of the seeds or corn considerably below the point where the fertilizer leaves the conductors $a^3$ $a^4$; hence it is obvious that the fertilizer will not come in contact with the grain, as the dirt will naturally tumble into the trench and cover the grain before the fertilizer shall have had time to come in contact with the corn.

A little to the rear of the delivery-spouts or conductors extend the curved ends of the coverers E E', which are secured at the top to the frame by the bolt $e^9 e^9$ and extend diagonally toward the rear of the machine to a point beneath the front portion of the wheel J. These coverers will agitate the ground and mix the dirt with the fertilizer, turning the dirt up over it, when it will be rolled down by the wheel J, thus leaving the corn and fertilizer all deposited in a smooth trench, which will be nicely rolled down after the planter has passed over the ground.

Beneath the fertilizer-hopper A it will be observed that we provide two conductors, $a^3$ $a^4$, the sides of which are parallel, the two conductors being separated by the partition $a^7$ and provided at their bottoms with openings $e^8 e^8$, below which and extending from a point directly between the two conductors are the deflectors $e^5 e^5$. It will also be observed that the corn-hopper B is also provided with a conductor, $b^5$, which extends in a direct line from the opening $b^3$ to the bottom of the plow S, as will be clearly seen in Fig. 7. In this same figure the part of the fertilizer is designated by the arrows $e^{9'}$, while the corn is designated in the same figure by the arrows $b^6$.

The upper front portion of the plow-blade S is provided with holes $s s$, to which is attached the clevis $s'$. By these holes the depth at which the plow will run may be adjusted to suit the circumstances. The plow-blade S is also provided with a brace, $t$, which extends from its upper outer portion diagonally to the foot of the blade, and is secured there at a point just in front of the conductors.

Q is a catch and brace for the plow-blade S.

The operation of the device is as follows: The fertilizer and corn being placed in their respective hoppers and the team attached to the draft-hooks $S^2$, the plow-blade S digs into the ground and the wheel J rotates as the team moves forward, vibrating the side pieces, F F', which operate the feed-plates $a$ $b^4$, each of the latter being provided with holes which register with holes in the bottom of the hoppers. The agitator $f'$, which is secured to the vibrating side piece, F', serves to keep the fertilizer stirred up and prevents the latter from packing or clogging in the hopper. The corn, which runs down through the conductor $b^5$, is deposited in the ground just back of the plow-blade S, while the fertilizer is deposited on a line with the corn, but considerably above it, and is separated from it by a layer of dirt, the brushes in the bottom of the hopper B serving to keep the holes in the feed-plate $b^4$ always open and free. While the projections $j j$ on the wheel J move one of the vibrating side pieces forward the opposite vibrating side piece is moved backward, and vice versa.

Having thus described our invention, what we desire to claim, and secure by Letters Patent, is—

1. The combination of the hoppers A and B, the feed-plates $a b^4$, and their supports, with the wheel J and the vibrating lever H, which latter serves as a means of alternately operating the feed-plates, substantially as described.

2. The combination of the hoppers and the feed-slides, the latter being provided with the spring-catches I, which serve alternately as propellers and idlers, with the vibrating lever H and the wheel J, substantially as described.

3. In a corn-planter, the plow-blade S, in combination with the hoppers A and B, the parallel conductors $a^3$ $a^4$, extending from one of the hoppers, and the conductor $b^5$, extending from the other hopper, the delivery-spout of the latter extending below and between those of the former, substantially as described, whereby the corn is deposited below the fertilizer, substantially as described.

4. In a corn-planter, the hoppers A and B, in combination with the horizontally-extended parallel vibrating side pieces, F and F', provided with the catches I, having the springs $I^3$ and the serrated plates $f^4$, in combination with the vibrating lever H, provided with cogs $h$, substantially as set forth.

5. In a corn-planter, the combination of the hoppers A and B, the parallel conductors $a^3 a^4$, the oppositely-inclined conductor $b^5$, the plow-blade S, having wings C' $C^2$, the bottoms of which are secured to the plow-blade S at a distance above the lower portion of the plow S, and the coverers E E', which are curved in opposite directions, substantially as described, whereby the corn is deposited below the fertilizer and the latter is agitated and covered out of contact with the corn, as set forth.

6. In a corn-planter, the combination of the hopper, the frame, and the plow-blade, of the brace *t*, extending diagonally across the two outer portions of the plow-blade, with the conductors, the wings, and the wheel J, substantially as described.

GEORGE F. NUTTING.
    PEMBROKE S. RICH.
    JOEL GARFIELD.

Witnesses to Geo. F. Nutting:
 GEORGE A. WOODWARD,
 EDWIN A. HILDRETH.

Witnesses to P. S. R. and J. G.:
 ELLIOTT H. PEABODY,
 GEORGE E. BURT.